(No Model.)
T. JACOBS.
STEAM PIPE SLEEVE.
No. 446,685.　　　　　　　　　　　Patented Feb. 17, 1891.
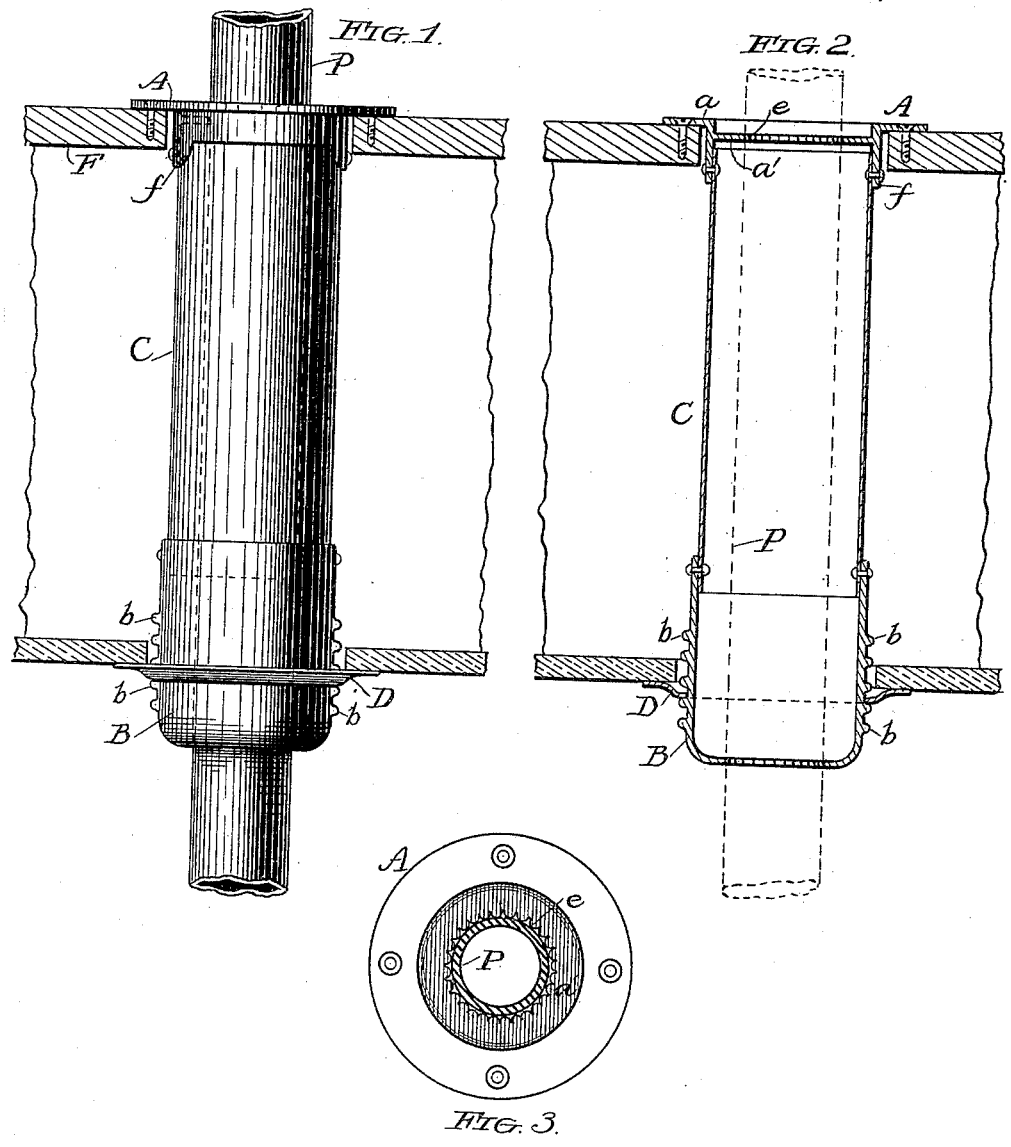

UNITED STATES PATENT OFFICE.

THEODORE JACOBS, OF CHICAGO, ILLINOIS.

STEAM-PIPE SLEEVE.

SPECIFICATION forming part of Letters Patent No. 446,685, dated February 17, 1891.

Application filed August 23, 1890. Serial No. 362,827. (No model.)

*To all whom it may concern:*

Be it known that I, THEODORE JACOBS, a citizen of the United States, residing at Chicago, Cook county, Illinois, have invented a new and useful Improvement in Steam-Pipe Sleeves, of which the following is a specification.

My invention relates to that class of sleeves which are used upon steam-pipes to insulate them from the wood-work where they pass through the floors of buildings; and it is designed particularly to provide a sleeve that may be readily adjusted to the different thicknesses of floors, and also allow a free circulation of air between the sleeve and the steam-pipe.

It consists, broadly, of a floor-collar, a ceiling-collar, and a connecting-cylinder.

It further consists of details of construction, hereinafter more fully described, and particularly pointed out in the claim.

Figure 1 is a side elevation of my invention. Fig. 2 is a sectional view of the same. Fig. 3 is a top plan view. Fig. 4 is a bottom plan view.

A represents the collar of the sleeve, which sets upon the floor F.

B represents the collar at the ceiling end of the sleeve, and C the cylindrical portion connecting the two collars.

P represents the steam-pipe passing through the sleeve.

The collar A has a flat portion $a$, which rests upon the floor, and a depressed portion $a'$ around the pipe, which allows the joint to come closer to the floor when connection is made at this point.

The cylinder C is made preferably of galvanized iron or sheet metal and is riveted to the flange $f$ on the collar A and to the collar B. The diameter of C is made somewhat greater than that of the steam-pipe, leaving an air-space about the pipe.

The ceiling-collar B at its upper end fits over the cylinder C, one telescoping the other, and the two are riveted together. At its lower end it tapers off to the diameter of the steam-pipe. The ring D slides on over B, the notches $d\ d$ in the ring passing over the studs $b\ b$ on the collar, and by turning it part way around it is locked at any desired height and adjusted to the thickness of the partition.

The inner edge $e$ of the collar A and the lower edge $e'$ of the collar B are serrated or broken, in order to prevent a tight joint and permit a free circulation of air through the sleeve.

It will be seen that the sleeve may be adjusted to different thicknesses of floors in three different ways: first, the cylinder C, being made of galvanized iron or sheet metal, may before the parts are riveted together be readily cut any desired length; second, the parts B and C sliding into one another permit of considerable adjustment before they are riveted together, and, third, the adjustment of the ring D upon the collar B, as above described.

What I claim, and desire to secure by Letters Patent, is—

The herein-described steam-pipe sleeve, consisting of the combination of the floor-collar A, having the serrated inner edge $e$, the ceiling-collar B, having the serrated inner edge $e'$, the cylinder C, loosely surrounding the pipe, and the adjustable ceiling-ring D, having the notches $d\ d$, sliding on over the studs $b\ b$, all substantially as shown and described.

THEODORE JACOBS.

Witnesses:
LOUIS V. LE MOYNE,
FRANCIS J. LE MOYNE.